United States Patent
Mo et al.

(10) Patent No.: US 10,095,793 B2
(45) Date of Patent: Oct. 9, 2018

(54) COLLECTION AND MANAGEMENT OF PRECISION USER PREFERENCE DATA

(75) Inventors: Stanley Mo, Portland, OR (US); Claudio J. Ochoa, Villa Allende (AR); Gustavo D. Domingo Yaguez, Villa Allende (AR); Victor Szilagyi, London (GB); Elliot Smith, Northfield (GB)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 13/997,403

(22) PCT Filed: Dec. 13, 2011

(86) PCT No.: PCT/US2011/064572
§ 371 (c)(1),
(2), (4) Date: May 12, 2014

(87) PCT Pub. No.: WO2013/039538
PCT Pub. Date: Mar. 21, 2013

(65) Prior Publication Data
US 2015/0039634 A1    Feb. 5, 2015

Related U.S. Application Data

(60) Provisional application No. 61/533,451, filed on Sep. 12, 2011.

(51) Int. Cl.
*G06F 17/30* (2006.01)
*H04L 12/58* (2006.01)

(52) U.S. Cl.
CPC .. *G06F 17/30867* (2013.01); *G06F 17/30702* (2013.01); *H04L 51/046* (2013.01)

(58) Field of Classification Search
CPC ......... G06F 17/30864; G06F 17/30286; G06F 17/30702
USPC ...................................................... 707/754
See application file for complete search history.

(56) References Cited

U.S. PATENT DOCUMENTS

| | | | |
|---|---|---|---|
| 7,650,342 B2 | 1/2010 | Sugiyama et al. |
| 8,250,623 B2 | 8/2012 | Yabe et al. |
| 2005/0177538 A1 | 8/2005 | Shimizu et al. |
| 2006/0090184 A1 | 4/2006 | Zito et al. |
| 2007/0074245 A1 | 3/2007 | Nyako et al. |
| 2007/0219985 A1 | 9/2007 | Aravamudan et al. |

(Continued)

FOREIGN PATENT DOCUMENTS

| | | |
|---|---|---|
| CN | 101273632 A | 9/2008 |
| CN | 101296362 A | 10/2008 |

(Continued)

OTHER PUBLICATIONS

Office Action Japanese Patent Application No. 2014-529697, dated Feb. 17, 2015, 3 pages including 2 pages of English translation.

(Continued)

*Primary Examiner* — Shahid Alam
(74) *Attorney, Agent, or Firm* — Jordan IP Law, LLC

(57) ABSTRACT

Methods and systems may involve storing device-specific user preference data to a local device and receiving a real-time request from a remote device. One or more user coefficients may be used to filter the device-specific user preference data in response to the request. In one example, the user preference data includes keyword data and the filtered keyword data is used to discover and present information to the user via the remote device.

14 Claims, 5 Drawing Sheets

(56) References Cited

U.S. PATENT DOCUMENTS

| | | |
|---|---|---|
| 2007/0265857 A1 | 11/2007 | Shivaji Rao |
| 2008/0109415 A1 | 5/2008 | Yabe et al. |
| 2008/0212932 A1 | 9/2008 | Lee et al. |
| 2008/0266449 A1 | 10/2008 | Rathod et al. |
| 2008/0301166 A1 | 12/2008 | Sugiyama et al. |
| 2011/0137894 A1 | 6/2011 | Narayanan et al. |

FOREIGN PATENT DOCUMENTS

| | | |
|---|---|---|
| CN | 101477554 A | 7/2009 |
| CN | 100568236 C | 12/2009 |
| EP | 1594069 A1 | 9/2005 |
| JP | 2007528628 A | 10/2007 |
| JP | 2007536654 A | 12/2007 |
| JP | 2008124574 A | 5/2008 |
| JP | 2008299860 A | 12/2008 |
| JP | 2010067023 A | 3/2010 |
| JP | 2011061668 A | 3/2011 |
| TW | 200924459 A | 6/2009 |
| WO | 2005122013 A1 | 12/2005 |
| WO | 2010029936 A1 | 3/2010 |
| WO | 2010128198 A1 | 11/2010 |
| WO | 2013/039538 A1 | 3/2013 |
| WO | 2013039538 A1 | 3/2013 |

OTHER PUBLICATIONS

Office Action and Search Report for Chinese Patent Application No. 201180073418.X, dated Nov. 26, 2015, 30 pages including 20 pages of English translation.

International Preliminary Report on Patentability and Written Opinion received for PCT Patent Application No. PCT/US2011/064572, dated Mar. 20, 2014, 6 pages.

Uchiyama et al., "Consulting system on the Internet with the implement of interface agent" (with English Abstract), Information Processing Society of Japan, May 22, 1999, pp. 33-40, vol. 99, No. 46, IPSJ electronic intellectual property and social infrastructure (EIP), Japan.

Extended European Search Report for European Patent Application No. 11872422.8, dated May 12, 2015, 9 pages, European Patent Office.

International Search Report and Written Opinion received for PCT application No. PCT/US2011/064572, dated Jul. 9, 2012, 9 pages.

Search Report for Taiwanese Patent Application No. 101131842, dated Feb. 19, 2016, 2 pages.

Office Action for European Patent Application No. 11872422.8, dated Jun. 13, 2016, 4 pages.

Examiner's Report for Japanese Patent Application No. 2014-529697, dated Apr. 11, 2016, 3 pages with 2 pages of English translation.

Notice of Allowance for Taiwanese Patent Application No. 101131842, dated Sep. 29, 2016, 3 pages including 1 page of English Translation.

Office Action for Chinese Patent Application No. 201180073418.X, dated Aug. 4, 2016, 21 pages including 12 pages of English Translation.

Office Action for Chinese Patent Application No. 201180073418.X, dated Jan. 11, 2017, 28 pages including 16 pages of English Translation.

Office Action for Chinese Patent Application No. 201180073418.X, dated May 12, 2017, 17 pages including 10 pages of English translation.

Office Action for KR Application No. 10-2015-7014354 dated Jan. 2, 2018, 9 pages including 1 page of English summary.

COLLECTION AND MANAGEMENT OF PRECISION USER PREFERENCE DATA

CROSS-REFERENCE TO RELATED APPLICATIONS

The present application claims the benefit of priority to U.S. Provisional Patent Application No. 61/533,451 filed Sep. 12, 2011.

BACKGROUND

Traditional approaches to tracking user preferences may involve aggregating preference data for many users in a central location and using statistical analysis to identify preference tendencies on a demographic basis. Aggregating potentially sensitive data in a central location, however, may give use to privacy and/or security concerns. Moreover, such an approach may fail to adequately capture individual aspects of user likes and dislikes that may deviate from group demographics.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a computer readable storage medium having a set of instructions which, if executed by a processor, cause a computer to store device-specific user preference data to a local device. The instructions may also cause a computer to receive a real-time request from a remote device, and use one or more user coefficients to filter the device-specific user preference data in response to the request.

Embodiments may also include a system having a communications interface and a keyword engine configured to store system-specific user preference data to the system. The system may also have a request module configured to receive a real-time request from a remote device via the communications interface, and a filter module configured to use one or more user coefficients to filter the system-specific user preference data in response to the request.

In addition, embodiments may include an apparatus having logic to store device-specific user preference data to a local device, and receive a real-time request from a remote device. The logic may also use one or more user coefficients to filter the device-specific user preference data in response to the request.

Additionally, embodiments may include a computer implemented method in which device-specific user preference data is received from a keyword engine of a local device. The device-specific user preference data may be stored to the local device, wherein a real-time request for context-appropriate user preference data may be received from a remote device. The method may provide for selecting one or more user coefficients based on the real-time request and using the selected one or more user coefficients to filter the device-specific user preference data in response to the request. Moreover, the method may involve using a chat protocol to transmit the filtered device-specific user preference data to the remote device.

Other embodiments may include at least one computer accessible storage medium having a set of instructions which, if executed by a processor, cause a computer to receive device-specific user preference data from a keyword engine of a local device, store the device-specific user preference data to the local device, and receive a real-time request for context-appropriate user preference data from a remote device. In addition, the instructions, if executed, may cause a computer to select one or more user coefficients based on the real-time request, use the selected one or more user coefficients to filter the device-specific user preference data in response to the request, and use a chat protocol to transmit the filtered device-specific user preference data to the remote device.

Figure 1:
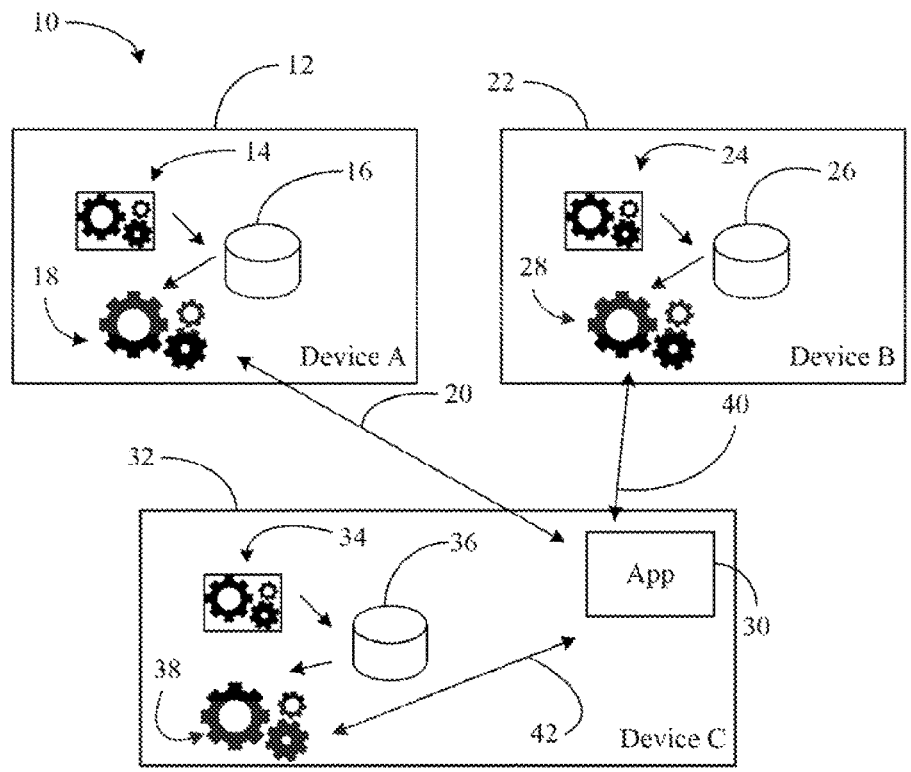
FIG. 1 is a block diagram of an example of an information sharing architecture.

Turning now to FIG. 1, a computing environment 10 is shown in which user preference data is exchanged between platforms in real-time. In the illustrated example, a first device ("Device A") includes a keyword engine 14 that is used to populate a device-specific user profile database 16. The first device (as well as the other illustrated devices) 12 may represent a wide variety of platforms such as, for example, a smart television (TV), e-book reader, server, personal computer (PC), laptop computer, smart tablet, smartphone, personal digital assistant (PDA), mobile Internet device (MID), media player, in-vehicle-infotainment (IVI) system, etc. The keyword engine 14 may therefore monitor one or more applications executing on the device 12 for user preference related content. For example, in the case of a TV, the keyword engine 14 may scan a video signal for embedded text such as closed captioning information, subtitles and/or metadata, and identify proper nouns as user preference data and flag them as keywords. Other example implementations of the user preference data include, but are not limited to, lyrics of songs, words in e-books, metadata carried or described by a system to uniquely identify photos, watermarked pictures, video/images identified via facial/object recognition, and audiobook content.

Similarly, a second device ("Device B") 22 may include a keyword engine 24 that is used to populate a device-specific user profile database 20, and a third device ("Device C") 32 may include a keyword engine 34 that is used to populate a device-specific user profile database 36. The second and third devices 22, 32, may also include any of the aforementioned or other types of platforms, wherein any of the devices 12, 22, 32, may be shared by multiple users (e.g., TV or IVI system) or dedicated to a single user (e.g., smartphone or e-book reader).

Moreover, the devices 12, 22, 32 may achieve off-platform communication via one or more of a wide variety of technologies. For example, one or more of the devices 12, 22, 32 may achieve off-platform communication using wireless technology such as, for example, cellular telephone (e.g., Wideband Code Division Multiple Access/W-CDMA (Universal Mobile Telecommunications System/UMTS), CDMA2000 (IS-856/IS-2000), etc.), Wi-Fi (Wireless Fidelity, e.g., Institute of Electrical and Electronics Engineers/ IEEE 802.11-2007, Wireless Local Area Network/LAN Medium Access Control (MAC) and Physical Layer (PHY) Specifications), LR-WPAN (Low-Rate Wireless Personal Area Network, e.g., IEEE 802.15.4-2006). Bluetooth (e.g., IEEE 802.15.1-2005, Wireless Personal Area Networks), WiMax (e.g., IEEE 802.16-2004, LAN/MAN Broadband Wireless LANS), GPS (Global Positioning System), spread spectrum (e.g., 900 MHz), and other RF (radio frequency) telephony technologies. One or more of the devices 12, 22, 32 may also use wired technology (e.g., RS-232 (Electronic Industries Alliance/EIA), Ethernet (e.g., IEEE 802.3-2005), power line communication (e.g., X10, IEEE P1675), USB (e.g., Universal Serial Bus, e.g., USE Specification 3.0, Rev. 1.0, Nov. 12, 2008, USE Implementers Forum), DSL (digital subscriber line), cable modem, T1 connection, etc.), to communicate.

The illustrated third device 32 includes an application 30 that issues real-time requests 20, 40, and 42 to the devices 12, 22, 32, respectively, wherein the real-time requests 20, 40, 42, are for context-appropriate user preference data. In general, each of the devices 12, 22, 32, may use one or more user coefficients to filter the locally stored device-specific user preference data in response to the requests 20, 40, 42. More particularly, the user coefficients may be selected based on the content of the requests 20, 40, 42, themselves. For example, the first device 12 may be a TV, wherein the real-time request 20 is a time-stamped (e.g., noon) message requesting user preference data related to a certain family member (e.g., Mom). In such a case, the first device 12 may use "Mom" and "noon" as user coefficients in order to extract filtered preference data 18 from the user profile database 16. Accordingly, the filtered preference data 18 may include keywords that have been extracted from video-embedded text (e.g., closed captioning, subtitles) while Mom was watching television at or around noon. Other potential user coefficients include, but are not limited to, the type of media and content (e.g., genre, class, playlists, etc.), the context of the device, the adjacent applications (e.g., used with prior or after), the day of the week (e.g., weekdays, weekends), the time of year (e.g., holidays, seasons), the presence of multiple users, and so forth.

Similarly, the second device 22 may be a smartphone, wherein the real-lime request 40 causes the second device 22 to extract filtered preference data 28 from the user profile database 26. Thus, in the above scenario of a request for Mom at noon, the filtered preference data 28 may include metadata associated with music that Mom may have been listening to or web sites that Mom may have been browsing at or around noon previously. The third device 32 may also extract filtered preference data 38 from the user profile database 36 in response to the real-time request 42 from the application 30. Thus, the third device 32 may include a smart tablet, wherein the filtered preference data 38 may include metadata and/or keywords associated with web sites that the user has visited, movies that the user has watched, etc., at the requested time associated with the real-time request 42.

The filtered preference data 18, 28, 38, which may also be time-stamped, may be returned to the requesting application 30 with an expiration parameter. In this regard, the data sent by each device 12, 22, 32, may have a temporal and contextual timeout. For instance, music sent from a car platform to a smartphone may only be accurate for particular times of day, which may change as the user's taste changes and they are introduced to new things. As a result, the coefficient and/or keyword information sent by different platforms may "expire" or be useful for only a short period of time on the requesting platform. As will be discussed in greater detail, the application 30 may consolidate the filtered preference data 18, 28, 38 in a "fusion" model that may provide an extremely accurate representation of the user's preferences to be developed in the context of the particular moment in time. Simply put, the illustrated approach is able to create subtle modifications to the content presented to users based on differences in the user state and context. In addition, the user information applied to create these subtle modifications in recommended content can be delivered with an "active" expiration, which may be related to a window of time or context, such as location or a specific usage only. Also, the user data can be so configured as to have a "passive" expiration; that is the data may be useful for only a very narrow scenario and/or the data may be subject to frequent, but moderate change rendering it relatively useless for precision user recommendations over time.

Figure 2:
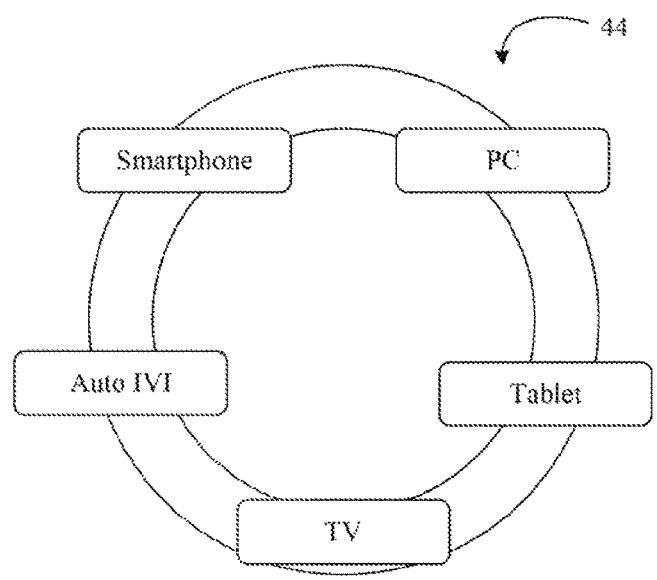
FIG. 2 is an illustration of an example of a device usage circle according to an embodiment.

FIG. 2 shows an example of a device usage circle 44 that demonstrates the relationships that may exist between the devices used by a particular individual. Tracking these relationships and related device-specific user preference data may enable the likes and dislikes of a specific user to be captured, wherein such likes and dislikes may deviate from group demographics and be disregarded by conventional approaches. For example, it may be determined that the user listens to a certain type of music when at work versus when driving alone in the car. Similarly, it may be determined that the user watches different shows and/or movies when alone as opposed to with other family members. Indeed, the video content typically shown on the automotive IVI may be quite different from the video content shown on a bedroom TV. Each of these differences, and related preferences, may be captured using the real-time techniques described herein and stored locally upon each platform. Through this process, very specific and non-diluted data representing the interests and preferences of each user of this platform can be captured. Unlike a general demographic format, which may consolidate all users into major "buckets" and then try to create generalized advertising for this segment of users (for example), the system described herein enables an advertiser to create a specific opportunity for each user based on the collected information with expected higher success rates, as a result.

Figure 3:
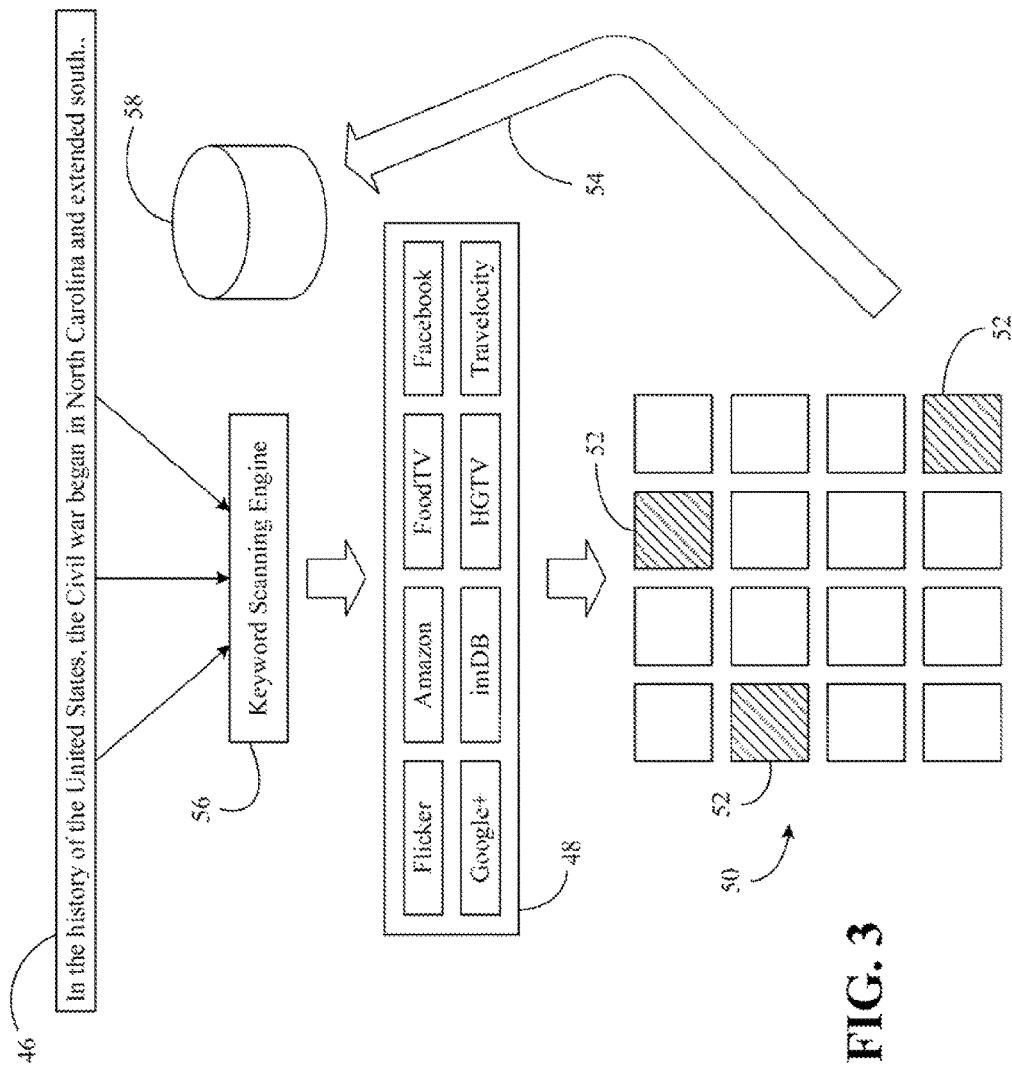
FIG. 3 is a block diagram of an example of a keyword engine usage model according to an embodiment.

Turning now to FIG. 3, one approach to leveraging a keyword engine 56 is shown. The keyword engine 56 may be readily substituted for any or all of the keyword engines 14, 24, 34 (FIG. 1), already discussed. Moreover, the keyword engine 56 may be implemented remotely, for example, in a cloud computing infrastructure. In the illustrated example, the keyword engine 56 monitors the embedded text 46 of a program viewed on the display of a television. In the content "In the history of the United States, the Civil War began in North Carolina and extended south . . . ", the keyword engine 56 may flag, the proper nouns "United States", "Civil War" and "North Carolina" as keywords reflective of one or more user preferences (e.g., user preference data). In general, the selected keywords may be added to a user profile database 58, as already discussed.

As the keywords are extracted from the user profile database 58 on a real-time basis, they may be applied to one or more web service content resources 48 in an effort to discover content of interest 50 that may be in turn presented to the user in question. In the illustrated example, the user selects a subset 52 of the overall content of interest 50 as being actually of interest. The selected subset 52 may be applied to the user profile database 58 in a feedback loop 54, wherein the feedback loop 54 may enable the keyword engine 56 to further refine (e.g., tune) its internal rules as to the selection of keywords from the embedded text 46. This "carouseling" of modifiers and discovery terms may help discriminate a user's interest in "United States," "Civil War," and "North Carolina", and understand that the interest may not be of each term in isolation of one another, but only in the context of the entire subject line taken as a whole. Such an approach may prevent sending useless content and advertising on isolated topics that may not be of interest to the end-user and, instead, may provide insight as to the true interest of the customer.

Figure 4:
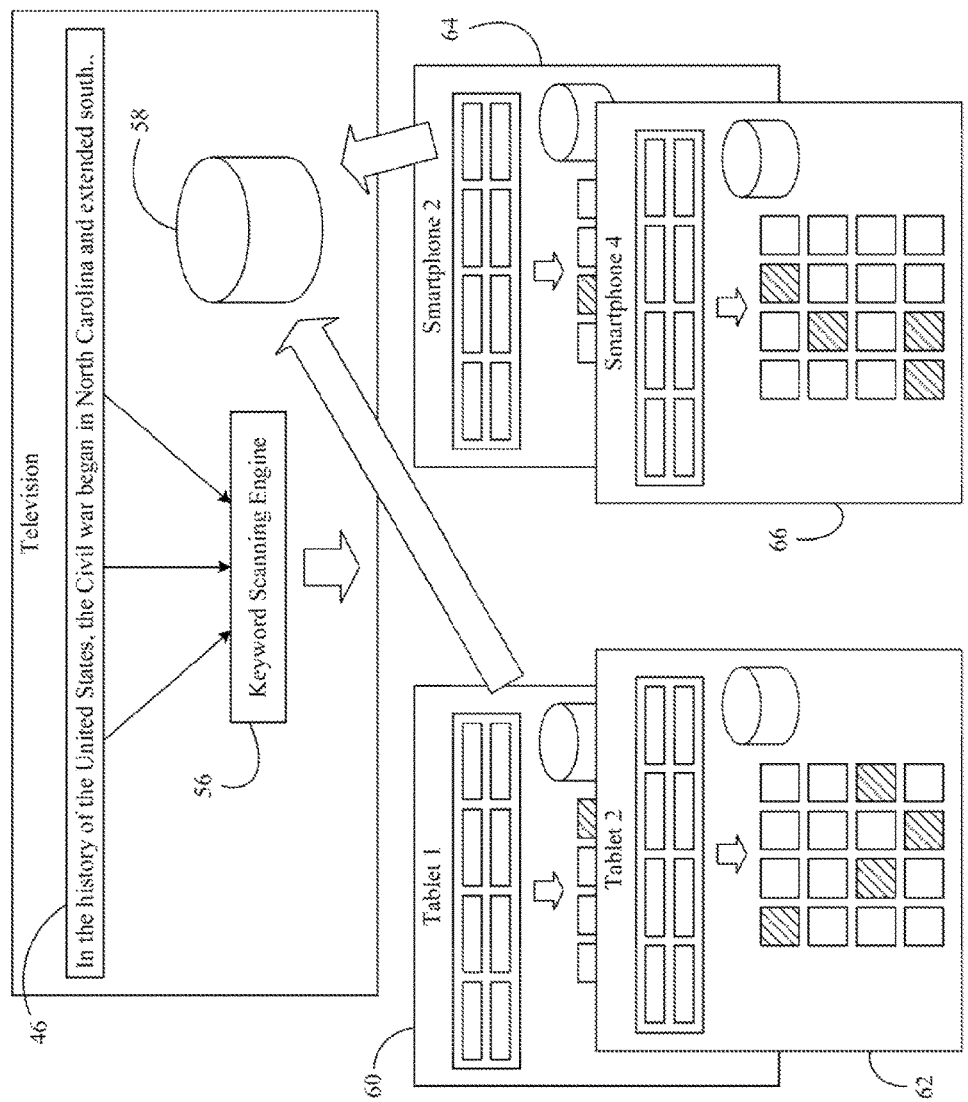
FIG. 4 is a block diagram of an example of a keyword engine usage model for a plurality of devices according to an embodiment.

FIG. 4 demonstrates that the user selections may be fed back into the user profile database 58 from an array of devices such as tablets 60, 62, smartphones 64, 66, and so forth. Thus, user clicks and other actions may provide "modifier" feedback to any of the other platforms on a real-time basis. In fact, the clicks and responses from multiple devices interacting with a common medium (such as a TV) can be determined to be from multiple family members, friends and acquaintances, and so the modifier feedback may be captured as variations in user response based on a social environment as opposed to being alone viewing the same content. The additional precision gained here is how the presence and interaction of others may influence the end-user's pattern of selection and content interest which may also be captured in the individual databases.

Figure 5:
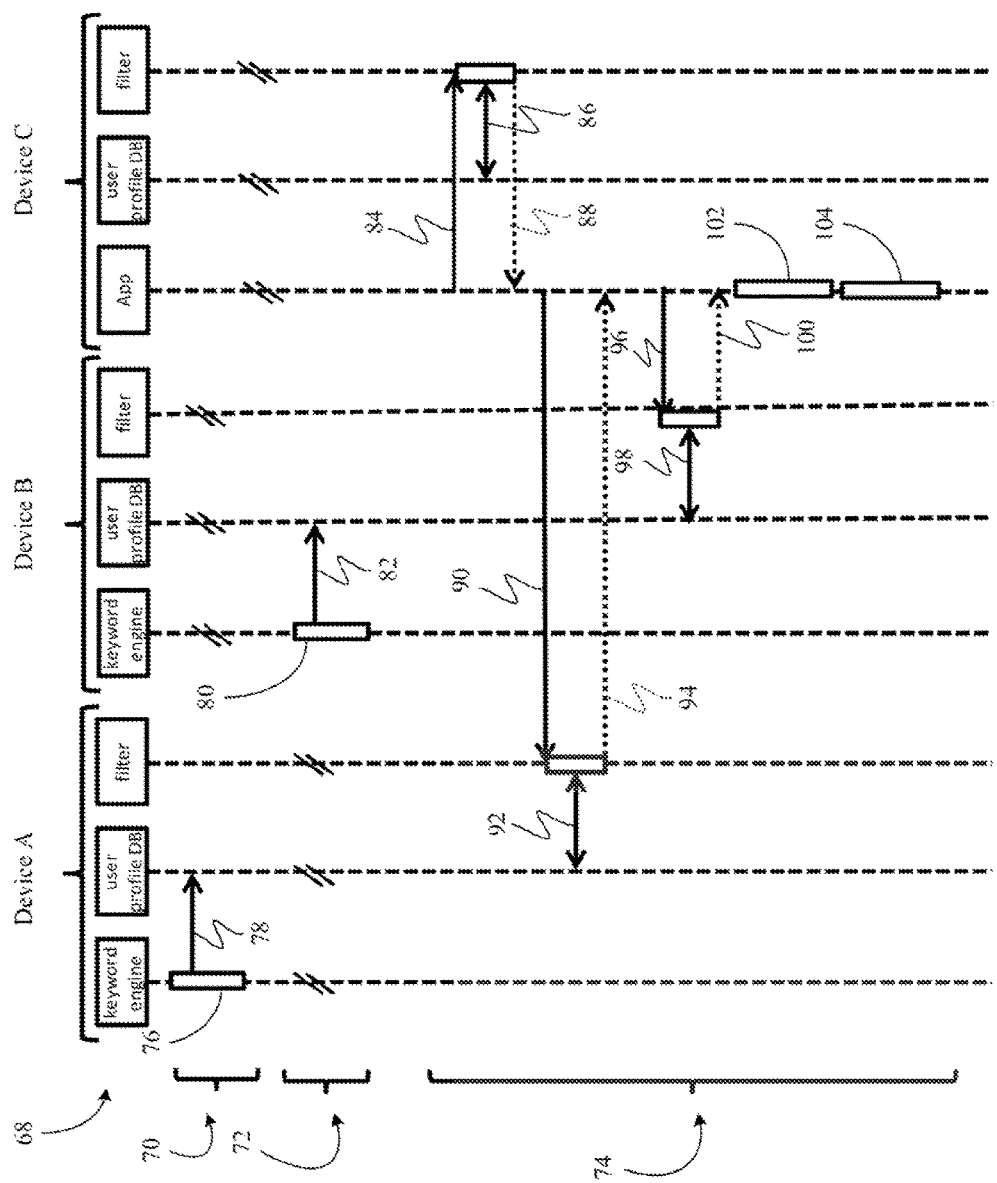
FIG. 5 is a messaging sequence diagram of an example of an information sharing scenario according to an embodiment.

Turning now to FIG. 5, a messaging sequence 68 between three devices (e.g., "Device A", "Device B", and "Device C") is shown. In general, three time periods are shown. A first time period 70 occurs while a user is operating Device A, a second time period 72 occurs while the user is operating Device B, and a third time period 74 occurs while the user is operating Device C. During the first time period 70, the keyword engine of Device A may extract one or more keywords at processing block 76 and store the extracted keywords to a local user profile database along arrow 78. Similarly, during the second time period 72, the keyword engine of Device B may extract one or more keywords at processing block 80 and store the extracted keywords to a user profile database of Device B along arrow 82.

During time period 74, an application resident on Device C may request context dependent keyword data from a filtering module of Device C along arrow 84, wherein the filtering module may apply various user coefficients and/or modifiers to the stored keyword data along arrow 86 based on the content of the request. The filtering process may result in filtered and context dependent keyword data being returned to the application along arrow 88. Similarly, the application of Device C may request context dependent keyword data from a filtering module of Device A along arrow 90, wherein the filtering module may apply one or more user coefficients and/or modifiers to the locally stored keyword data along arrow 92. The filtering process may result in filtered and context dependent keyword data being returned to the application of Device C along arrow 94. In addition, the application of Device C may also request context dependent keyword data from a filtering module of Device B along arrow 96. The filtering module may apply one or more user coefficients and/or modifiers to the locally stored keyword data along arrow 98, wherein the filtering process may result in filtered and context dependent keyword data being returned to Device C along arrow 100.

Illustrated block 102 provides for fusion of the data from the multiple devices, wherein relevant recommendations may be displayed to the user at block 104.

Figure 6:
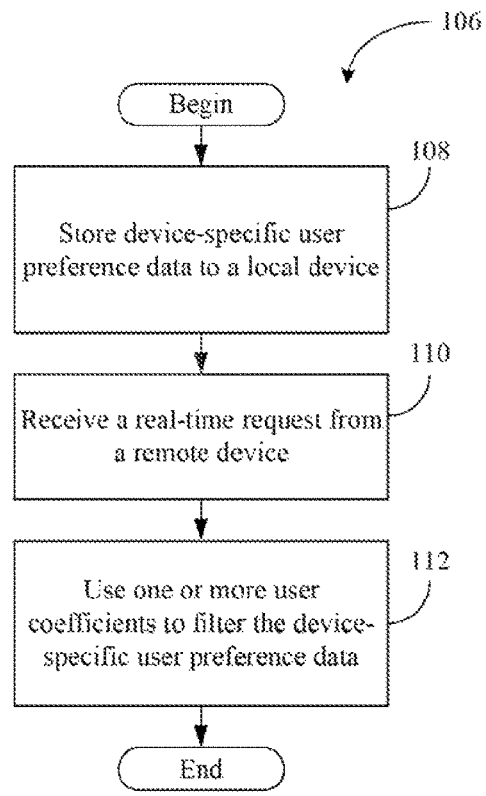
FIG. 6 is a flowchart of an example of a method of managing user preference data according to an embodiment.

FIG. 6 shows a method 106 of managing user preference data. The illustrated method 106 may be implemented, for example, as a set of executable logic instructions stored in at least one machine- or computer-readable storage medium such as random access memory (RAM), read only memory (ROM), programmable ROM (PROM), flash memory, firmware, microcode, etc., in configurable logic such as, for example, programmable logic arrays (PLAs), field programmable gate arrays (FPGAs), complex programmable logic devices (CPLDs), in fixed-functionality hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the illustrated operations may be written in any combination of one or more programming languages, including, but not limited to, an object oriented programming language such as C++ or the like and conventional procedural programming languages, such as the "C" programming language or similar programming languages. Moreover, various aspects of the illustrated functionality may be implemented as embedded logic of a processor using any of the aforementioned circuit technologies.

Illustrated processing block 108 stores system/device-specific user preference data to a local device, wherein a real-time request may be received from a remote device at block 110. As already discussed, the real-time request may be for context-appropriate user preference data. Block 112 may use one or more coefficients to filter the device-specific user preference data in response to the request. In one example, chat protocol is used to transmit the filtered device-specific user preference data to the remote device.

Figure 7:
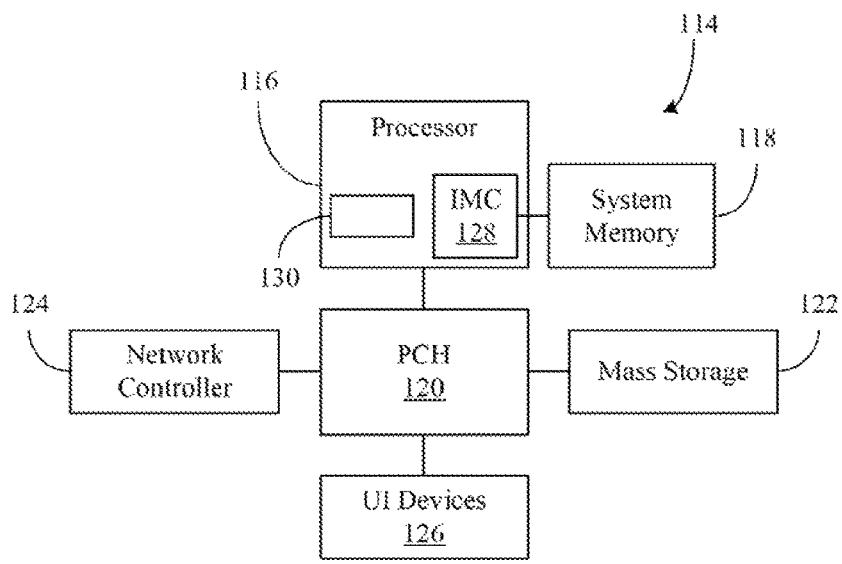
FIG. 7 is a block diagram of an example of a system according to an embodiment.

Turning now to FIG. 7, as computing system 114 is shown in which a context-appropriate user preference data may be provided to other devices on demand. In the illustrated example, the computing system 114 has a processor 116, system memory 118, a platform controller hub (PCH) 120, mass storage (e.g., hard disk drive/HDD, optical disk, flash memory, etc.) 122, a network interface/controller 124, one or more user interface (UI) devices 126 and various other controllers (not shown). The system 114 may have a media consumption capability and may therefore be part of, for example, a TV, laptop, smart tablet, smart phone, personal computer (PC), server, workstation, etc. Indeed, the system 114 may be partially or totally incorporated into one or more devices such as the devices 12, 22, 32 (FIG. 1), already discussed. Thus, the processor 116 may include one or more processor cores capable of executing a set of stored logic instructions, and an integrated memory controller (IMC) 128 configured to communicate with the system memory 118. The system memory 118 may include, for example, dynamic random access memory (DRAM) configured as a memory module such as, for example, a dual inline memory module (DIMM), a small outline DIMM (SODIMM), etc.

In the illustrated example, the processor 116 is configured to execute logic 130 that stores system-specific user preference data to the system, and receives real-time requests from remote devices via a communications interface such as the network controller 124. The logic 130 may also use one or more user coefficients to filter the system-specific user preference data in response to the requests. Thus, for example, the logic 130 may include a keyword engine, request module, filter module and/or response module to implement one or more aspects of the method 106 (FIG. 6), already discussed.

The illustrated PCH 120, sometimes referred to as a Southbridge of a chipset, functions as a host device and may communicate with the network controller 124, which could provide off-platform wireless communication functionality for a wide variety of purposes such as, for example, cellular telephone, Wi-Fi, LR-WPAN, Bluetooth, WiMax, GPS, spread spectrum, and other RF telephony purposes. The network controller 124 may also provide off-platform wired communication functionality. The UI (e.g., touch screen, liquid crystal display/LCD, light emitting diode/LED, keyboard, mouse, etc.) devices 126 may be capable of enabling a user to interact with and perceive information from the system 114.

Thus, techniques described herein may capture and process real-time user data related to a specific user's choices and preferences for media, content and social networks across multiple platforms throughout the user's day. Additionally, the privacy of the user data may be enhanced by storing the data locally on the devices in question. The information may be used to provide high levels of customization for user suggestions on products, media, TV shows and relevant content based on, for example, the identity of the user, what platform the user is operating, the time of day, personal tendencies (for instance, music preference in the car versus on a smartphone at the office), who else the user may be interacting with and how sequences of activities influence one another. Such an approach allows for the creation of very precise, dynamic user databases on a per platform basis, which may be more economical with regard to platform storage and compute resources, distribute the computation of user preference coefficients across the end-user's network of devices, and increase privacy through the segregation of user data. Indeed, it may be virtually impossible to attack a single platform to capture a user's entire profile according to the techniques described herein.

Certain aspects of embodiments of the present invention may be implemented using hardware, software, or a combination thereof and may be implemented in one or more computer systems or other processing systems. Program code may be applied to the data entered using an input device to perform the functions described and to generate output information. The output information may be applied to one or more output devices. One of ordinary skill in the art may appreciate that embodiments may be practiced with various computer system configurations, including multi-processor systems, minicomputers, mainframe computers, and the like. Embodiments may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include at least one machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" may accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

We claim:

1. At least one non-transitory computer readable storage medium comprising a set of instructions which, when executed by a processor, cause a computer to:
  receive device-specific user preference data from a keyword engine of a local device;
  store the device-specific user preference data to the local device, which is independent of a central location, to enhance privacy;
  receive, from a remote device, a real-time request for context-appropriate user preference data stored at the local device;
  select one or more user coefficients based on the real-time request;
  use the selected one or more user coefficients to extract and filter the device-specific user preference data stored in the local device in response to the request; and
  use a chat protocol to transmit the filtered device-specific user preference data to the remote device, and
  wherein the instructions, when executed, cause a computer to add an expiration parameter to the filtered device-specific user preference data.

2. The at least one non-transitory computer readable storage medium of claim 1, wherein the device-specific user preference data is to include at least one of closed captioned information, subtitle information, song lyrics, e-book words, photo metadata, video annotation information, watermark information, facial recognition information, object recognition information and audiobook content.

3. The at least one non-transitory computer readable storage medium of claim 1, wherein the selected one or more user coefficients are to include at least one of a user identifier, a time of day, a type of media, a type of content, a device context, one or more adjacent applications, a day of week, a time of year and a presence of multiple users.

4. A system comprising:
a communications interface;
a processor; and
at least one non-transitory computer readable storage medium including a set of instructions which, when executed by the processor, cause the system to,
store system-specific user preference data to the system, which is independent of a central location, to enhance privacy,
receive a real-time request for context-appropriate user preference data from a remote device via the communications interface, and
use one or more user coefficients to extract and filter the system-specific user preference data in response to the request,
wherein the instructions, when executed, cause the system to use a chat protocol to transmit filtered system-specific user preference data to the remote device,
wherein specific advertising is to be created for a user based, at least in part, on the extracted and filtered system-specific user preference data, and
wherein the instructions, when executed, cause the system to add an expiration parameter to the filtered system-specific user preference data.

5. The system of claim 4, wherein the instructions, if executed, cause the system to select the one or more user coefficients based on the real-time request.

6. The system of claim 5, wherein the one or more user coefficients are to include at least one of a user identifier, a time of day, a type of media, a type of content, a device context, one or more adjacent applications, a day of week, a time of year and a presence of multiple users.

7. The system of claim 4, further including a keyword engine to generate the system-specific user preference data.

8. The system of claim 7, wherein the device-specific user preference data is to include at least one of closed captioned information, subtitle information, song lyrics, e-book words, photo metadata, video annotation information, watermark information, facial recognition information, object recognition information and audiobook content.

9. An apparatus comprising:
logic to,
store device-specific user preference data to a local device, which is independent of a central location, to enhance privacy,
receive a real-time request for context-appropriate user preference data from a remote device, and
use one or more user coefficients to extract and filter the device-specific user preference data stored in the local device in response to the request,
wherein the logic is to use a chat protocol to transmit the filtered device-specific user preference data to the remote device to create specific advertising,
wherein the specific advertising is to be created for a user based, at least in part, on the extracted and filtered device-specific user preference data,
wherein the logic is to add an expiration parameter to the filtered device-specific user preference data.

10. The apparatus of claim 9, wherein the logic is to select the one or more user coefficients based on the real-time request.

11. The apparatus of claim 10, wherein the one or more user coefficients are to include at least one of a user identifier, a time of day, a type of media, a type of content, a device context, one or more adjacent applications, a day of week, a time of year and a presence of multiple users.

12. The apparatus of claim 9, wherein the logic is to receive the device-specific user preference data from a keyword engine of the local device.

13. The apparatus of claim 12, wherein the device-specific user preference data is to include at least one of closed captioned information, subtitle information, song lyrics, e-book words, photo metadata, video annotation information, watermark information, facial recognition information, object recognition information and audiobook content.

14. A method comprising:
receiving device-specific user preference data from a keyword engine of a local device;
storing the device-specific user preference data to the local device, which is independent of a central location, to enhance privacy;
receiving, from a remote device, a real-time request for context-appropriate user preference data stored at the local device;
selecting one or more user coefficients based on the real-time request;
extracting and filtering the device-specific user preference data stored in the local device based on the selected one or more user coefficients, in response to the real-time request; and
transmitting the filtered device-specific user preference data to the remote device using a chat protocol,
wherein specific advertising is to be created for a user based, at least in part, on the filtered device-specific user preference data that is transmitted to the remote device, and
wherein the instructions, when executed, cause a computer to add an expiration parameter to the filtered device-specific user preference data.

* * * * *